United States Patent [19]
Olson

[11] 3,881,980
[45] May 6, 1975

[54] METHOD FOR MAKING WEATHERSTRIPPING HAVING A FOAM PLASTIC CORE, A TOUGH OUTER SKIN, AND A SEALING SURFACE COVERED WITH FLOCKED FIBERS OR THE LIKE

[75] Inventor: Harold G. Olson, Westport, Conn.
[73] Assignee: H. G. Olson & Company, Incorporated, Amesbury, Mass.
[22] Filed: July 20, 1973
[21] Appl. No.: 380,945

Related U.S. Application Data
[63] Continuation-in-part of Ser. No. 186,237, Oct. 4, 1971, Pat. No. 3,758,992, which is a continuation-in-part of Ser. No. 44,977, June 10, 1970, abandoned.

[52] U.S. Cl. ............ 156/268; 156/271; 156/279; 264/160; 264/321
[51] Int. Cl. .................. B32b 31/00; B29c 17/14
[58] Field of Search .............. 156/287, 268–271, 156/279; 264/157, 160, 321

[56] References Cited
UNITED STATES PATENTS

| | | | |
|---|---|---|---|
| 2,575,259 | 11/1951 | Cox et al. | 264/321 |
| 2,867,222 | 1/1959 | Otto et al. | 264/321 |
| 3,104,192 | 9/1963 | Hacklander | 264/321 |
| 3,123,656 | 3/1964 | Rochlin | 264/321 |

Primary Examiner—Douglas J. Drummond
Attorney, Agent, or Firm—Parmelee, Johnson & Bollinger

[57] ABSTRACT

A method of making sealing elements in the form of weatherstripping especially for slidable closures such as windows, wherein the weatherstripping comprises a flexible, plastic foam substrate provided on at least a part of its outer surface with a tough, abrasion-resistant skin. The weatherstripping made by this process is installed by being pulled into a confining channel in one closure member and is provided with flocked fibers or other comparable surface contact material extending away from the first closure member to engage a second closure member to reduce infiltration of air and water.

The preferred method for making this weatherstripping includes the steps of forming a sheet of plastic foam material, for example, cross-linked polyethylene, into a series of elongate substrate portions sized to proper thickness for installation in the confining channel, forming an outer skin of tough film onto at least the top and bottom substrate surfaces, attaching the flocked fibers or other surface contact material to the top substrate surfaces, and dividing the plastic sheet into individual strips to define a plurality of sealing elements.

7 Claims, 8 Drawing Figures

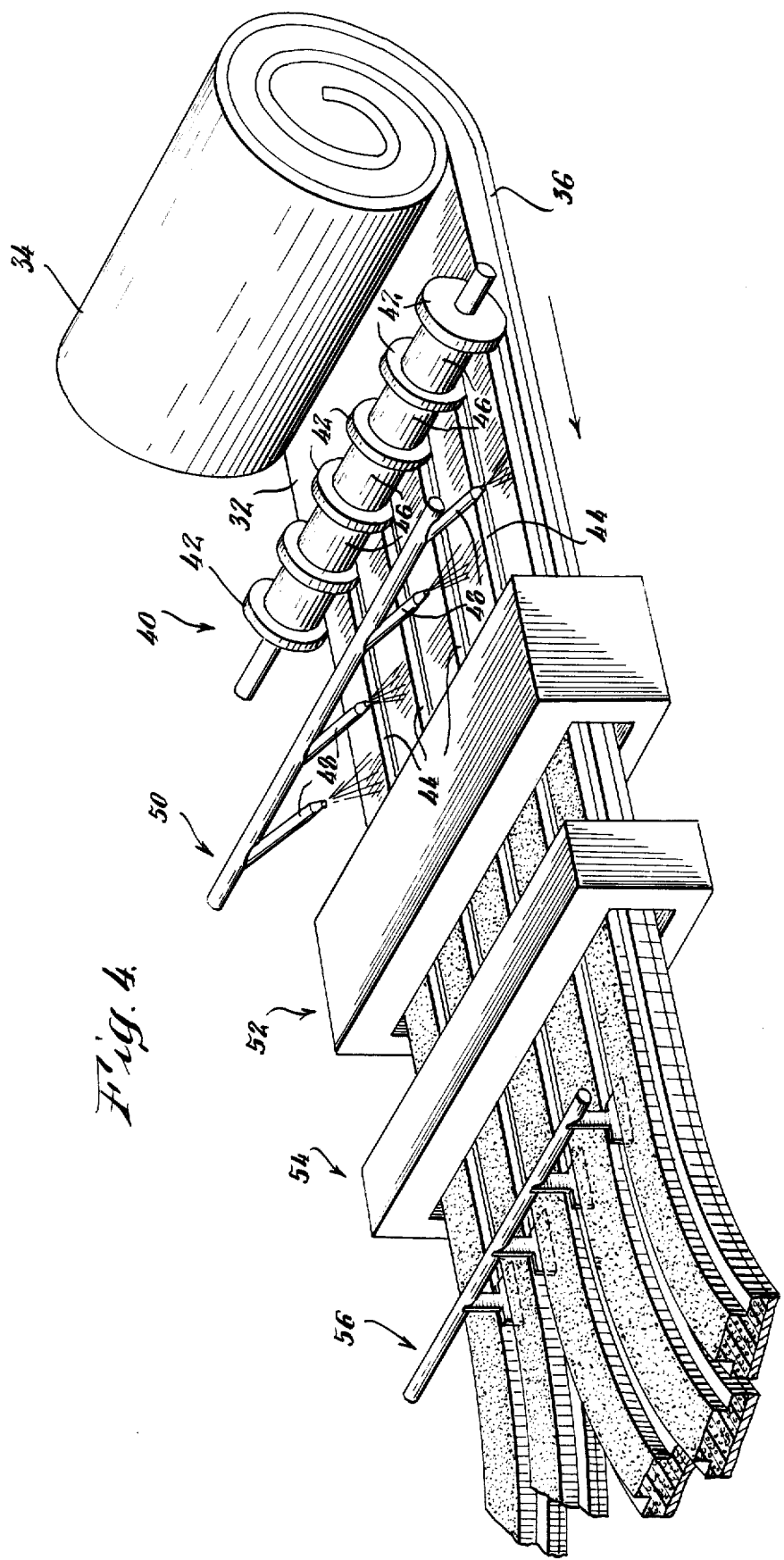

METHOD FOR MAKING WEATHERSTRIPPING HAVING A FOAM PLASTIC CORE, A TOUGH OUTER SKIN, AND A SEALING SURFACE COVERED WITH FLOCKED FIBERS OR THE LIKE

This application is a continuation-in-part of my co-pending application, Ser. No. 186,237, filed on Oct. 4, 1971, now Pat. No. 3,758,992, which in turn is a continuation-in-part of my prior application Ser. No. 044,977, now abandoned, filed on June 10, 1970.

BACKGROUND OF THE INVENTION

1. Field of the Invention

This invention relates to improved methods for making a weatherstripping of the type disclosed in said co-pending application.

2. Description of the Prior Art

Various weatherstripping techniques are in use at the present time. Commonly, the closure is formed with a retaining channel (see for example, U.S. Pat. No. 2,785,813) in which is placed a weatherstrip comprising a relatively thin flat strip of fabric, or cloth-like material, having secured thereto a woven or flocked pile of fibers. To establish full sealing contact between the ends of the fibers and the adjacent member of the closure to be sealed, the fibers typically must be relatively long, thus requiring very high density of pile ends in order to get cushioning resilience with air and water resistance.

However, the maximum densities available for such standard types of weatherstripping have not proven adequate from the standpoint of air and water resistance, and to achieve really good results it had been thought necessary to use ancillary fins or barriers such as shown in U.S. Pat. No. 3,175,256 (Horton) and 3,175,257 (Kessler). Nevertheless, as established in the above-identified copending application, a different and superior solution to the problem has been found. More particularly, it has turned out to be possible to solve the problem by means of a weatherstripping basically comprising a relatively thick, foamed plastic substrate provided with a tough outer skin.

Such foam substrate advantageously provides increased weatherstripping height which is impervious to air and water and which ensures good sealing contact between the flocked fibers and the adjacent closure, because of its superior resilience and compressibility. The tough outer skin on the substrate assures long life and resistance to damage. However, the manufacture of such desirable foamed plastic weatherstripping in an economical manner has presented some unique problems.

There are of course many different techniques known for processing foam materials. For example, U.S. Pat. No. 3,170,967 (Williams et al.) discloses a method of providing foam elements with resin coatings by a molding operation, and U.S. Pat. No. 3,123,656 (Rochlin) discloses a heated-roller method for shaping foamed plastic. However, none of the prior art known to applicant provides a suitable process for producing weatherstripping of the type disclosed in the above-mentioned copending application.

SUMMARY OF THE INVENTION

It should first be explained that weatherstripping produced by the method of the present invention comprises a relatively thick, foamed (i.e. cellular) plastic substrate insertable into a retaining groove of T-shape, with a portion of the substrate extending out through the groove mouth towards an adjacent closure member, and preferably covered with flocked fibers making intimate and tight sealing engagement therewith. Good results in many typical applications may be obtained by making the weatherstripping from selected known, conventional plastics, e.g. a foamed plastic such as cross-linked polyethylene. The particular plastic selected must provide a suitably compressible and resilient cellular substrate capable of carrying a tough outer skin which presents a slidably-smooth yet abrasion-resistant surface, permitting the weatherstripping to be readily pulled into a long channel while preventing excessive wear or tear of the material.

In a preferred process based on the present invention, to be described below in detail, the method of making such weatherstripping includes the following steps: (1) a stiff backing is laminated or otherwise formed on the bottom surface of a sheet of cellular foam plastic; (2) the top of the plastic sheet is then formed with a number of parallel grooves of relatively substantial depth to define between the grooves foamed weatherstripping substrate elements; (3) the substrate elements or "lands" between the grooves are sized to proper height (if necessary); (4) an adhesive is applied to the entire top of the sheet surface including the side groove wall surfaces; (5) a mass of flexible fibers is flocked onto the adhesive; (6) the adhesive is cured, and becomes a tough outer skin on the top of the substrate and on the side groove wall surfaces; and (7) the sheet is cut along the grooves to separate the weatherstripping elements.

An advantageous feature of the invention is that the tough outer skin is developed on the foam substrate after the grooves have been formed in the sheet of plastic. This sequence is especially important because, as will be explained in more detail, it ensures that the groove-forming step does not introduce difficult complications or problems, such as compressing or distorting the foam material between the grooves, or producing an outer skin having undesirable fractures or other comparable imperfections which detract from the desired weatherstrip performance. Other objects, aspects and advantages of the invention will in part be pointed out in and in part apparent from the following description considered together with the accompanying drawings.

BRIEF DESCRIPTION OF THE DRAWINGS

FIG. 4 pictorially illustrates the steps in the method of the present invention for making weatherstripping;

Weatherstripping made by the Method of the Present Invention

Figure 1:
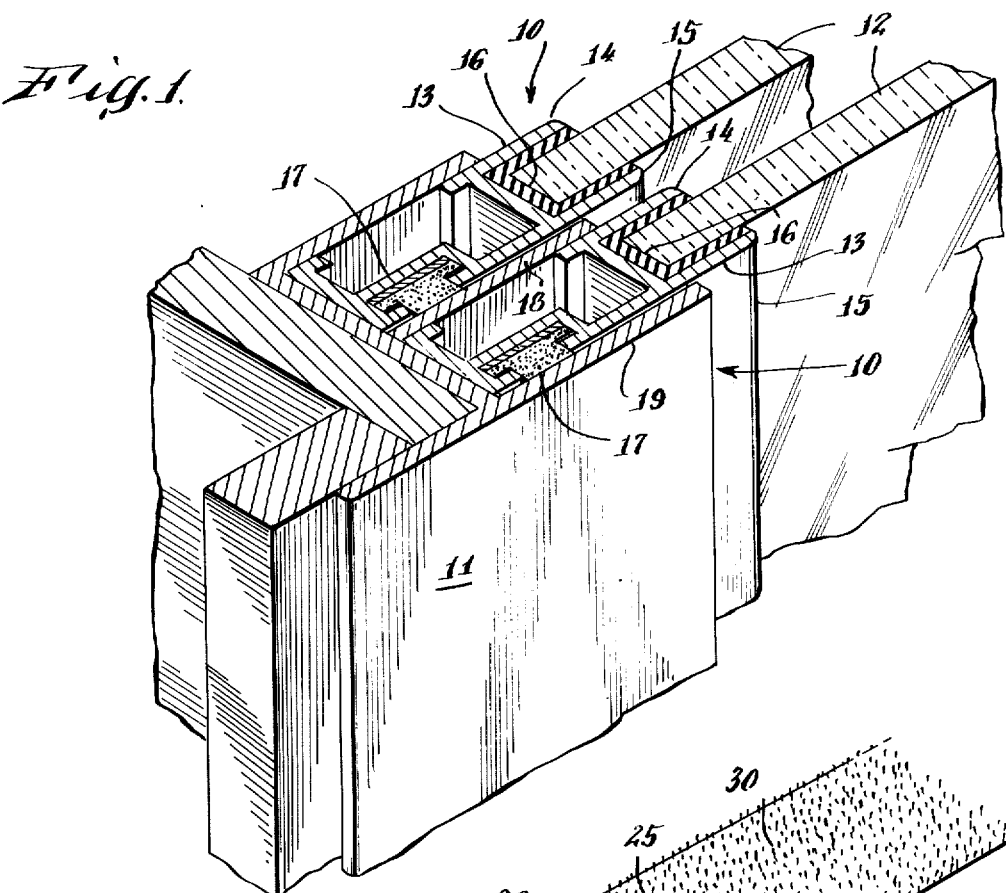
FIG. 1 is a perspective view of a storm sash in which weatherstripping made by the method of the present invention is utilized.

Before describing the method of the present invention, a brief description first will be presented of closure members including weatherstripping of the type formed by this method. Referring now to FIG. 1, there is shown a pair of adjacent storm sashes 10 in a supporting frame 11. Each storm sash carries a transparent pane 12 surrounded by an aluminum sash member 13. The pane 12 is held in place by a pair of outwardly extending lips 14 and 15 forming part of member 13. The panes can be insulated from the frame by suitable insulating material 16. An elongate channel 17 (shown also in FIGS. 2B and 3) is located within each sash and arranged with an opening slot or channel mouth facing adjacent member 18 and 19, respectively, of supporting frame 11. Within the channel 17 is a weatherstrip member of sealing element 20 now to be described.

Figure 2A:
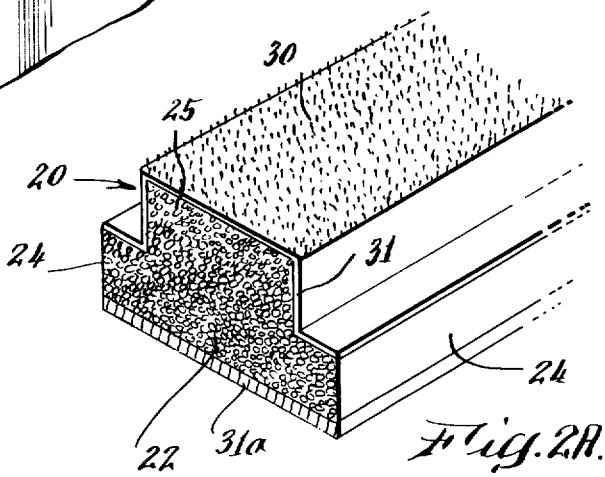
FIG. 2A is a perspective view showing the foam weatherstripping with an abrasion resistant outer skin.
Figure 3:
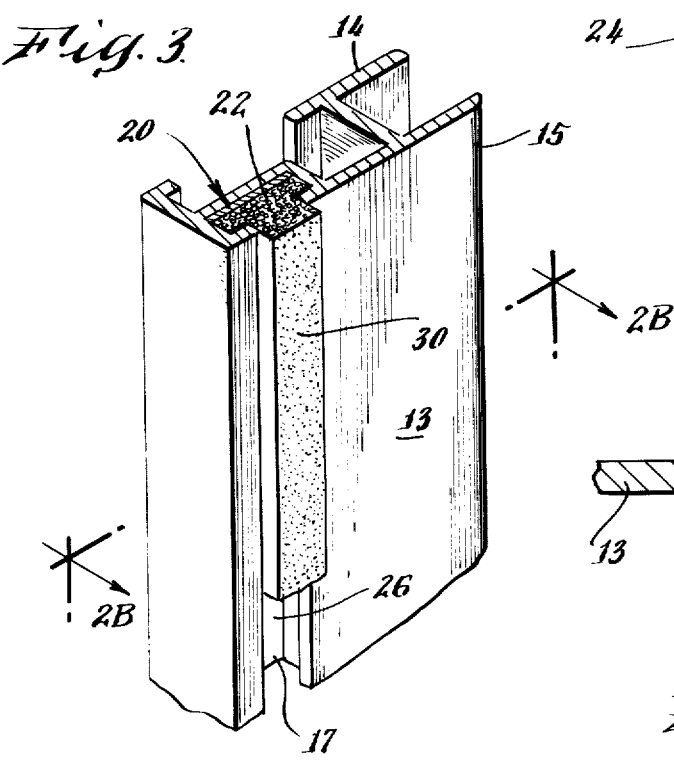
FIG. 3 is a perspective view showing the channel member with the weatherstripping in place.
Figure 2B:
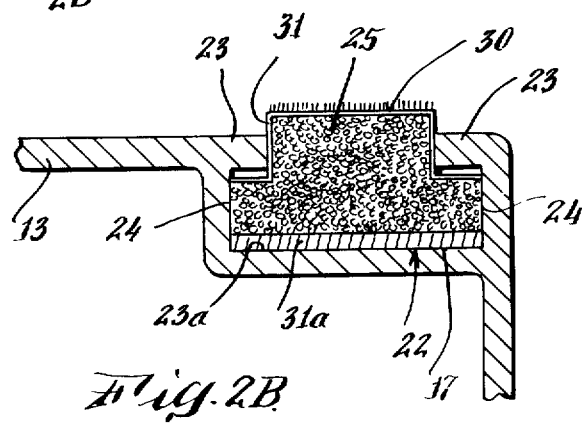
FIG. 2B is an enlarged sectional view of the channel member and weatherstripping of the present invention taken along the line 2B—2B of FIG. 3.

Referring also to FIGS. 2A, 2B and 3, sealing element 20 comprises a resilient and compressible substrate 22 of cellular material, i.e. having a large number of very small air pockets. This substrate is formed of a foamed plastic, such as cross-linked polyethylene presently sold under the trademark "Volara."

The substrate 22 preferably has an inverted T-shaped cross-section. The height of the side edges 24 of this substrate 22 may be slightly less than the height of the channel 17 defined between the inner surface of the lips 23 and the channel bottom 23a. This dimensional relationship facilitates easy installation of the weatherstripping in the channel 17.

The substrate is further formed with a raised central portion 25 which projects out a small distance through the slot or mouth 26, toward the window frame member. The sealing portion of the sealing element 20 comprises flocked flexible resilient fibers 30 secured to the outer surfaces of the central portion 25 to effect a tight intimate contact with the adjacent window frame and prevent air or water infiltration.

Materials other than flocked fibers may be used to provide a weatherstripping sealing surface. For example, plastic materials are presently known which expand upon application of heat, and may form a velvet-like surface suitable for sealing against an adjacent closure member. Materials which perform the function of fibers 30 may be referred to generally herein, and in the claims, as "surface sealing contact material."

The substrate may also be formed with a rectangular cross-section, the side edges of which may be compressed moderately by pressure engagement with the lips 23. The central portion of the substrate may then bulge out a small distance through the slot or mouth, towards the window frame member. This bulging portion presents a generally arcuate shape which extends above the surface of the retaining lips. The central portion of such a sealing element would also advantageously be provided with a sealing surface comprising flocked fibers or other suitable surface sealing contact material.

Referring more particularly to FIG. 2A, the material 22 used for the weatherstrip sealing element 20 consists of a cellular core having a tough outer skin 31 and a relatively thick, tough backing layer 31a. The fiber flocking 30 illustrated is secured directly to the skin. This outer skin is physically stronger than the foamed material and serves to structurally reinforce the cellular core, which by itself may be quite weak. This reinforcement, in cooperation with that provided by the backing layer, augments the pull strength substantially, and especially aids in enabling lengths of weatherstripping to be drawn into a retaining channel which may be several feet in length.

Further, the outer skin 31 serves to resist the deleterious effects of abrasion, encountered both when the weatherstripping is inserted into its retaining channel, which generally has sharp edges, and also when the sliding members move with respect to one another. Such outer skin also preferably is watertight, to prevent moisture absorption by the "open cell" types of some flexible foam plastics, when used as the substrate. Moreover, by use of special skin materials, the skin can be arranged to protect the substrate material from the harmful effects of ultra-violet radiation from exposure to the sun.

The Method of the Present Invention

FIG. 4 pictorially illustrates one preferred way of carrying out the present invention. A flexible foam plastic sheet 32 may be fed from a roll 34 through appropriate apparatus for performing each of the steps of this method. The sheet as supplied in its original state may or may not include a tough outer skin of the type which ultimately is to be provided for the weatherstripping functions and advantages previously disclosed.

The bottom of the plastic sheet is provided with a stiff backing 36 having strength substantially greater than that of the foam plastic material. This backing also gives the sheet 32 rigidity which aids in sheet handling while carrying out the subsequent steps of the method. Such stiff backing may be formed in any of many conventional ways or the backing may have previously been laminated onto the foam sheet at the time of manufacture. The backing may, for example, be adhesively secured, or in some cases flame laminated onto the sheet 32.

Figure 5:
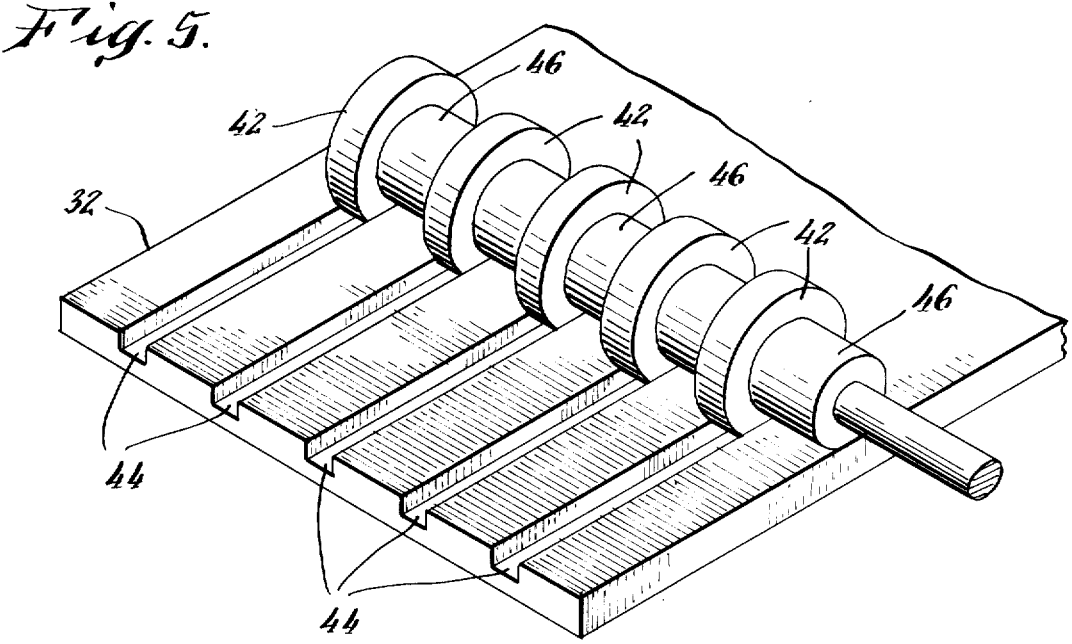
FIG. 5 is a perspective view illustrating the groove-forming and sizing process.

The plastic sheet 32 with its stiff backing 36 is transported to a groove-forming station 40. As shown in FIGS. 4 and 5, this station 40 is equipped with a series of heated rollers 42 which form a series of parallel grooves 44 in the foam plastic sheet 32 as the sheet passes by. The heat will cause the plastic material to melt beneath the rollers 42, thereby reforming the plastic to a relatively thin dimension in that region. The remaining intergroove "lands" define parallel strips which, in a subsequent step, can be sliced or cut apart at the groove centers for form weatherstrip sealing elements.

Figure 6:
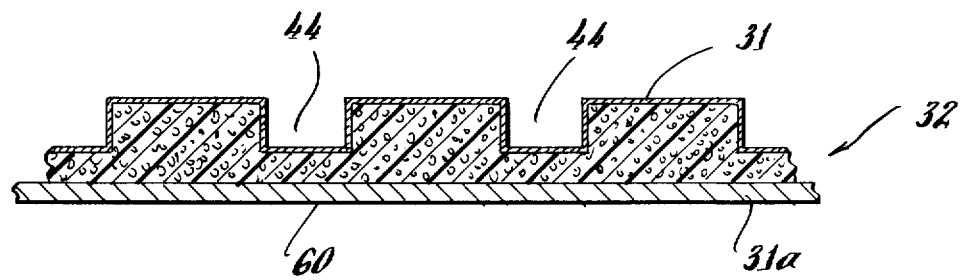
FIG. 6 shows in cross-section a sheet of foamed plastic processed in accordance with FIG. 5.
Figure 7:
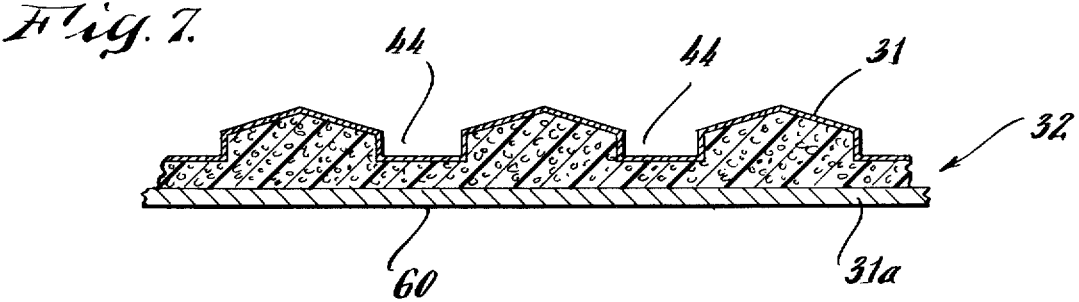
FIG. 7 shows a substrate having a different cross-sectional configuration.

The groove-forming unit may optionally be provided with a second series of heated cylindrical rollers 46, coaxial with the first series of rollers 42 and having smaller diameters than those rollers 42. Each roller 46 in the second series is positioned intermediate two rollers in the first series. Such rollers 46 are provided to size the weatherstrip elements to a thickness appropriate for use in a desired closure channel simultaneously with the groove forming operation. The forming station illustrated in FIGS. 4 and 5 would produce a foam plastic sheet having the cross-sectional shape illustrated in FIG. 6.

The adhesive used to attach flocked fibers to the top surface of the weatherstripping may advantageously serve as a tough outer skin on the top of the plastic sheet. Accordingly, after forming the grooves 44 in the sheet 32 and sizing the series of substrates, the fiber adhesive is applied in various known ways. For example, it may be sprayed from nozzles 48 uniformly onto the top of the sheet 32 and onto the groove sidewalls at an adhesive application station 50.

Following the application of the adhesive layer, the sheet of plastic 32 is transported through a flocking station 52 where a mass of resilient, flexible fibers 30 is applied by any known arrangement conventionally used for flocking. After the fibers have been applied, the adhesive is cured in the usual fashion to lock the fibers firmly in place at a curing station 54. This cured adhesive also preferably serves as the tough outer skin on the top of the strips of foamed material between the grooves 44, so as to avoid the need for adding further material to assure proper strength. Various adhesives may be used for the flocking, such as one selected from the polyurethane class of adhesives.

If the adhesive material chosen does not also meet the strength and/or other requirements of the specified tough outer skin, such skin should be independently applied at some point after the groove-forming step.

The forming and sizing steps which are shown in FIGS. 4 and 5 as being performed simultaneously may be performed at separate stations if desirable. These steps need not be performed by heated rollers but may for some applications be performed by rotating milling cutter elements or by a blade which slices the sheet to desired cross-sectional shape. The plastic sheet may alternatively first be flame heated and subsequently formed with chilled rollers. The substrate portions are finally divided by any of many known means into individual parallel weatherstrips to define a plurality of sealing elements, at a dividing station 56.

It is important that the tough skin cover the entire top substrate surface and the side wall surfaces of the lands, in a continuous protective layer. It has been found in that regard that if an effort is made to use as the tough outer skin a layer of material applied prior to groove formation, serious difficulties will be encountered. For example, if the grooves are formed by heated rollers having a moderate temperature, the tough skin will be maintained intact adjacent the side edges of the rollers, and thus will tend to be pulled down by the rollers into the grooves so as to compress the foamed material in the region between the grooves. This reduces the height of that material, thus negating a principal benefit of the foamed plastic substrate, and also tends to distort the configuration from the desired shape. If the heated rollers are sufficiently hot to form through the tough outer skin, the skin will be fractured along the groove side walls, exposing the weak cellular material of the foamed substrate interior, thereby reducing the desired strength and other weatherstrip properties to an unacceptable degree. Although some mitigation of the difficulties noted above can in particular instances be achieved by selecting special kinds of plastic skin material, e.g. of highly stretchable plastic, in general the results achieved are unsatisfactory. On the other hand, these difficulties are avoided in accordance with an important aspect of the present invention wherein the sheet 32 is formed with grooves before the tough outer skin is applied. the present invention particularly contemplates avoiding the application of flocking prior to formation of the grooves, even though such sequence would appear to provide benefits from a processing point of view. If the sheet has a preformed skin, this skin should be fractured in the region of the grooves during groove formation, in order to assure that the intergroove lands will not be compressed or distorted undesirably. A complete tough outer skin thereafter is applied to all substrate top and groove side wall surfaces.

Although several preferred embodiments of the invention have been disclosed herein, it is desired to emphasize that this is for the purpose of illustrating the invention and should not be considered to be necessarily limitative of the invention, since various other modification of the invention will be apparent to those skilled in this art for solving specific problems of weatherstripping.

I claim:

1. A method of making sealing elements in the form of weatherstripping for use in closures such as windows, doors, and the like, said weatherstripping comprising an elongate substrate formed with a core of foamed material providing flexibility and resilient compressibility and having a tough outer skin on the substrate core providing structural integrity therefor and resistance to damage due to abrasion during weatherstripping installation;

said substrate carrying a surface sealing contact material attached to and projecting outwardly away from the substrate for engaging a surface to be sealed by effecting a desirably tight, water-and-air resistant joint at the closure, said method comprising the steps of:

supplying a sheet of plastic foam material with the bottom of said sheet having a relatively stiff backing layer laminated thereto to provide rigidity to the foam sheet;

forming the top of said sheet with a series of parallel grooves presenting intergroove lands defining substrate portions the top surfaces of which are at least approximately parallel to said sheet bottom;

applying to at least said top surfaces of said substrate portions and the side wall surfaces of said grooves a tough outer skin having substantially greater strength than said foam core;

attaching a surface sealing contact material to the top surfaces of said substrate portions to project outwardly away therefrom to effect sealing contact with the surface to be sealed; and dividing said foam plastic sheet along said parallel grooves so as to form individual parallel strips including said substrate portions and defining a plurality of sealing elements for use as weatherstripping.

2. The method of making sealing elements as claimed in claim 1 wherein said tough outer skin is formed from a layer of adhesive used for attaching said surface sealing contact material.

3. The method of claim 2, wherein said grooves are formed by heated elements.

4. The method of claim 3, wherein said heated elements are rollers.

5. A method of making sealing elements in the form of weatherstripping for use in closures such as windows, doors, and the like comprising sliding members having a region of overlap to be sealed against infiltration of water and air by the weatherstripping, one of the members being formed in said region with a channel generally T-shaped in cross-section so as to present a pair of opposed lips which define a channel mouth, the effective depth of said channel being defined between the bottom surface of said channel and the inner surfaces of said lips; said weatherstripping being disposed in said channel and comprising an elongate substrate formed with a core of foamed material providing flexibility and resilient compressibility, a tough outer skin on the substrate core providing structural integrity therefor and resistance to damage due to abrasion during installation in said substrate; said substrate including a central portion extending into the channel mouth; said central portion carrying surface sealing contact material which projects out of said channel mouth for engaging the other sliding member to effect a desirably tight water-and-air resistant joint at the closure, said method comprising the steps of:

forming a sheet of plastic foam with a series of parallel grooves to define a series of elongate foam substrates between said grooves;

sizing the thickness of each of said substrates for at least substantially filling the effective depth of said channel to hold those portions of said substrate between the bottom channel surface and the inner lip surfaces and to provide that said central substrate portion will protrude up into said channel mouth to a desired position above the level of said inner lip surfaces;

laminating an outer skin of tough film having substantially greater strength than said foam onto at least the top surfaces of said foam plastic sheet between said parallel grooves;

adhesively attaching said sealing surface contact material to at least said top surfaces of said foam plastic sheet between said parallel grooves; and dividing said foam plastic sheet into individual parallel strips by cutting said sheet along said grooves to define a plurality of sealing elements.

6. The method of claim 5, wherein said sheet of plastic foam material is provided on its bottom surface with a relatively stiff backing layer laminated thereto to augment the rigidity of the foam strip; and adhesively attaching said sealing surface contact material to said substrate top surfaces by effecting adhesive engagement between said outer skin and said material.

7. The method of claim 5, wherein said tough outer skin is formed by applying a plastic adhesive to said surfaces in liquid form;

said sealing surface contact material comprising flocked fibers deposited on said plastic adhesive and secured firmly thereto by curing said plastic adhesive.

* * * * *